UNITED STATES PATENT OFFICE.

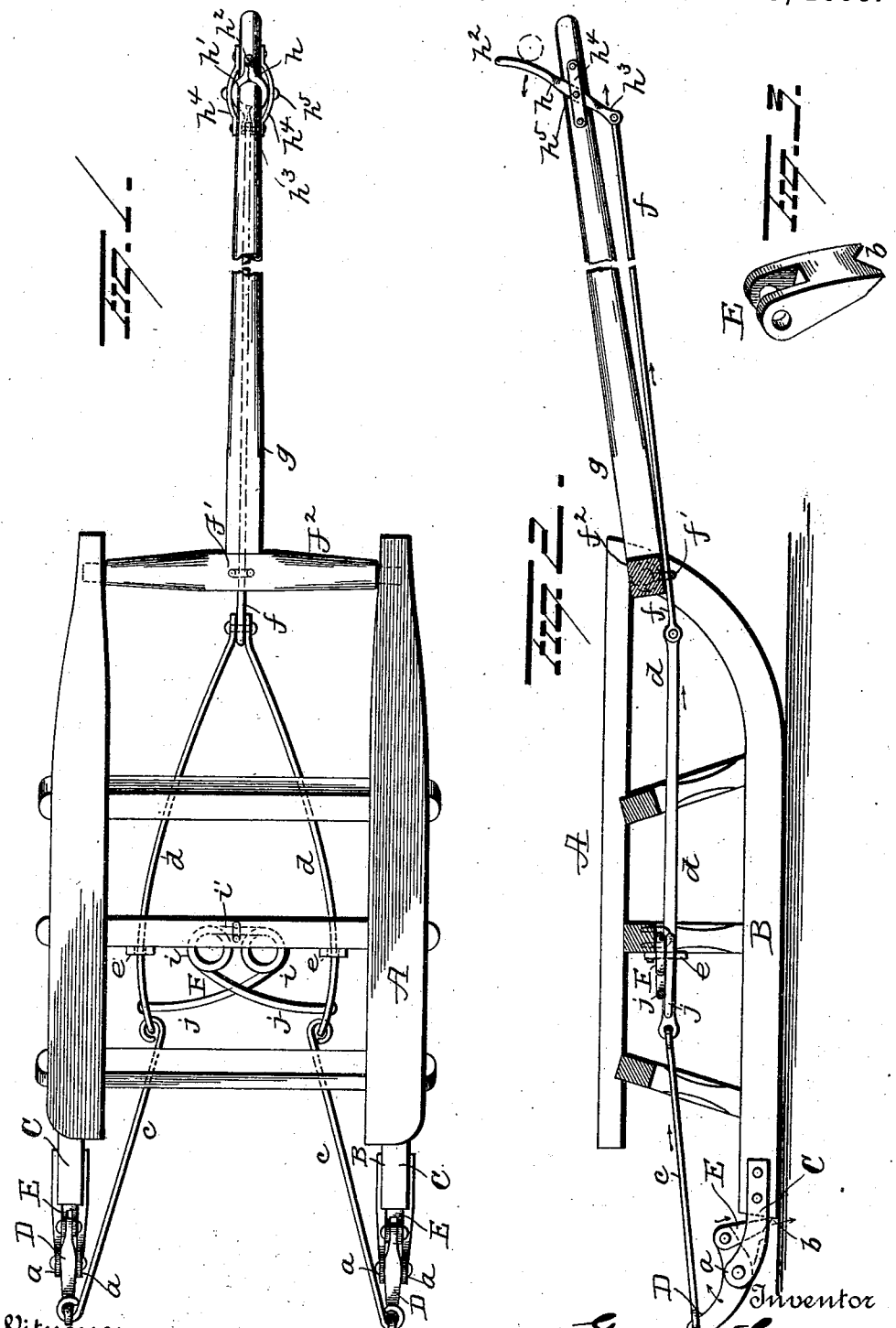

GILBERT LARSON, OF WAUKON, IOWA.

BRAKE FOR SLEIGHS.

SPECIFICATION forming part of Letters Patent No. 549,139, dated November 5, 1895.

Application filed April 11, 1895. Serial No. 545,353. (No model.)

*To all whom it may concern:*

Be it known that I, GILBERT LARSON, a resident of Waukon, in the county of Allamakee and State of Iowa, have invented certain new and useful Improvements in Brakes for Sleighs; and I do hereby declare the following to be a full, clear, and exact description of the invention, such as will enable others skilled in the art to which it appertains to make and use the same.

My invention relates to an improvement in sleighs, and more particularly to brakes therefor, the object of the invention being to produce brake devices for a sleigh adapted to be operated automatically from the neck-yoke of the harness, which devices shall be simple in construction, cheap to manufacture, capable of application to any sleigh, and which shall be effectual in all respects in the performance of their functions.

With these objects in view the invention consists in certain novel features of construction and combinations and arrangements of parts, as hereinafter set forth, and pointed out in the claims.

In the accompanying drawings, Figure 1 is a view of a sleigh, showing the application of my improvements thereto. Fig. 2 is a sectional view. Fig. 3 is a detail view.

A represents a sleigh, comprising suitable framework and runners B. To the rear end of each runner an arm or bracket C is secured and made with ears $a$, between which a lever D is pivotally connected at a point between its ends, the free end of the shorter arm of each lever occupying a position between the free end of the arm or bracket C and the rear end of the runner. A brake bar or finger E is pivotally connected at its upper end to each lever D and depends between the free end of the arm or bracket C and the rear end of the runner, the lower end of each brake bar or finger being made with teeth $b$. The levers D are preferably made somewhat curved, and to their rear ends rods $c\ c$ are pivotally connected. The forward ends of the rods $c\ c$ are pivotally connected to the rear ends of two rods $d\ d$, the latter being preferably made of spring metal and curved. The rods $d$ are passed loosely through perforated brackets or arms $e$, secured to the frame of the sleigh, and at their forward ends, said bars are secured together and pivotally connected to a rod $f$. The rod $f$ extends forwardly through an eye $f'$, secured to the pivoted cross-bar $f^2$ of the tongue $g$, and at its forward extremity is pivotally connected to the lower end of a lever $h$, pivotally connected between its ends to the tongue, in proximity to the free end of the latter.

The lever $h$ may be conveniently made by bending a bar of metal upon itself, so as to form an opening $h'$ for the accommodation of the tongue, the arm $h^2$ of said lever being made to project above the tongue and the arm $h^3$ projecting below the same. To insure a proper connection between the lever $h$ and the tongue, I prefer to secure to the respective sides of the latter plates $h^4$, having perforations for the reception of the ends of the pivot-pin $h^5$. The upper arm of the lever $h$ is engaged by the neck-yoke of the harness, so that when the horse "holds back" the upper arm of the lever $h$ will be moved rearwardly and the lower arm forwardly, thus pulling on the rod $f$. The forward movement of the rods $f\ d\ c$ will cause the brake-levers D to be moved on their fulcrums and the teeth on the brake-bars or fingers E to engage the ground and impede the progress of the sleigh. When the pressure on the lever $h$ shall have been relieved, the brake bars or fingers will be raised and the parts made to assume their normal positions by means of a spring F. This spring is preferably made of a single piece of spring-wire and secured to the frame of the sleigh. The spring comprises two coils $i\ i$, connected together by a cross-bar $i'$, (which latter is secured to the sleigh,) and arms $j\ j$, in which the free ends of the coils terminate. From the coils $i$ the arms $j$ project in opposite directions, so as to cross between their ends, and the free ends of said arms are passed loosely through perforations in proximity to the free ends of the spring-rods $d$.

My improvements are exceedingly simple in construction, not liable to get out of order, are accurate in operation, cheap to manufacture, easy to apply to any sleigh, and are effectual in every respect in the performance of their functions.

Having fully described my invention, what I claim as new, and desire to secure by Letters Patent, is—

1. The combination with the runners of a sleigh and a tongue, of arms or brackets secured to the rear ends thereof, levers pivotally connected between their ends in said arms or brackets, depending brake bars or fingers pivotally connected to said levers, movable rods connected with the sleigh, rods connecting said movable rods with the said levers, a lever pivotally connected with the tongue of the sleigh, and a rod connected at one end to said last-mentioned lever and at the other end to said movable rods, substantially as set forth.

2. The combination with a sleigh, of arms or brackets secured to the runners thereof, brake levers pivotally connected to said arms or brackets, perforated arms secured to the sleigh, rods adapted to pass loosely through said arms and connected together at their forward ends, a rod connected to the forward ends of said first-mentioned rods and connections between the latter and the brake levers, brake bars connected to the brake levers, and a spring for moving said devices in one direction, substantially as set forth.

3. The combination with a sleigh, of arms or brackets secured to the runners thereof, brake levers pivoted to said arms or brackets, brake bars or fingers pivotally connected to said levers and depending therefrom, movable rods connected with the sleigh, rods connecting said movable rods with the brake levers, a rod connected to the forward ends of said movable rods, and a spring secured to the sleigh, said spring having two arms connected with the respective movable rods, substantially as set forth.

4. In a sleigh having a tongue, the combination with brake levers pivotally connected thereto and brake bars or fingers pivotally connected to said brake levers and depending therefrom, of movable spring rods connected with the sleigh, rods connecting the movable rods with the brake levers, a lever pivotally connected to the tongue in proximity to the free end of the latter and adapted to be connected with the neck yoke or the harness, a rod connected at one end to said lever and at the other end to said movable rods, and a spring for returning the parts to their normal positions, substantially as set forth.

5. In a sleigh having a tongue, the combination with brake levers pivotally connected thereto and brake bars or fingers pivotally connected to said levers and depending therefrom, of movable bars connected with the sleigh and connected together at their forward ends, rods connecting said movable rods with the brake levers, a lever pivotally connected with the tongue, a rod connected at one end to said last-mentioned lever and at the other end to said movable rods, and a spring secured to the sleigh, said spring comprising two coils terminating in arms projecting from the coils in opposite directions so as to cross between their ends, the free ends of said arms being loosely connected with said movable rods so as to return the parts to their normal positions, substantially as set forth.

6. In a sleigh, the combination with the runners thereof, of curved levers pivoted at or near their middles to the extreme rear ends of the runners and forming continuations thereof, brake bars pivoted to the forward ends of the curved levers and means extending forward from the outer ends of the levers for operating and controlling the brake bars, substantially as set forth.

In testimony whereof I have signed this specification in the presence of two subscribing witnesses.

GILBERT LARSON.

Witnesses:
H. G. JOHNSON,
G. A. BAKKUM.